(No Model.)
W. S. EVERETT.
HARNESS SADDLE TREE.
No. 380,624. Patented Apr. 3, 1888.
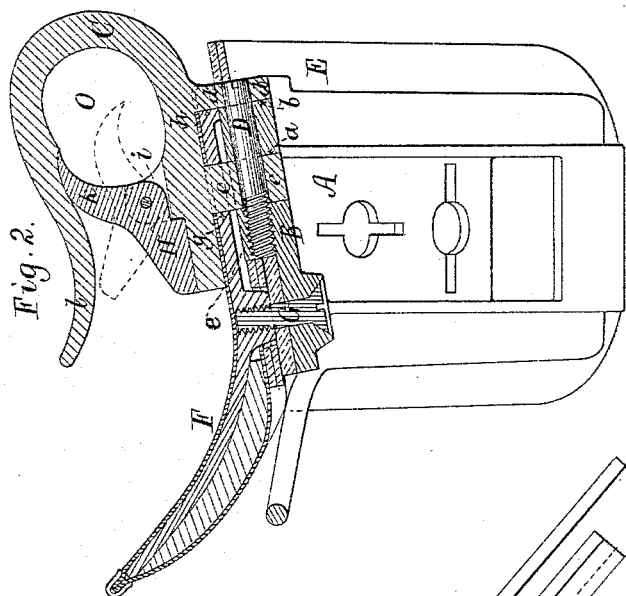
Witnesses.
E. A. S. Wellington.
Susan A. Dutton.
Inventor.
Willard S. Everett.

UNITED STATES PATENT OFFICE.

WILLARD S. EVERETT, OF HYDE PARK, MASSACHUSETTS.

HARNESS-SADDLE TREE.

SPECIFICATION forming part of Letters Patent No. 380,624, dated April 3, 1888.

Application filed October 24, 1887. Serial No. 253,268. (No model.)

*To all whom it may concern:*

Be it known that I, WILLARD S. EVERETT, a citizen of the United States, residing at Hyde Park, in the county of Norfolk and State of Massachusetts, have invented a new and useful Improvement in Harness-Saddle Trees, and in the Checkrein-Hooks Thereof; and I do hereby declare the same to be fully described in the following specification, and represented in the accompanying drawings, of which—

Figure 1 is a front view, and Fig. 2 a longitudinal and vertical section, of a harness-saddle tree and its checkrein-hook provided with my invention. Fig. 3 is a top view of a portion of the tree. Fig. 4 is a side view of the checkrein-hook as adapted to be applied to an ordinary saddle-tree.

In carrying out my invention I provide the tree at the middle of the top portion thereof with a projection or abutment, as shown, in order to increase its thickness to furnish a suitable bearing or bearings for the checkrein-hook when made in accordance with my improvement, and as hereinafter described.

In the drawings, A denotes the tree having on and projecting above its top B an abutment, $e$, in which and extending down through the top of the tree are arranged a hole or opening, $a$, and a notch, $b$. The abutment $e$ is somewhat narrower than the top B, and extends a little more than half the distance from the front of the tree toward the rear of it, and on each side of said abutment are rabbets $f\,f$, which receive the apron E. The abutment extends up through an opening in the said apron and receives on its top the saddle F, which is provided with a hole or opening, $g$, and a notch, $h$, to receive the projections $c\,d$ from the checkrein-hook C, which rests on the top of the saddle, as shown. Its projections $c$ and $d$ pass down through the hole $g$ and notch $h$ in the saddle and the hole $a$ and notch $b$ in the tree, and are connected with the tree by a screw, D, which screws through said projections and into the abutment and firmly secures them together, as represented. The saddle is also further connected with the tree by a screw, G, in the usual manner.

Pivoted to ears $i$, extending upward from the base portion of the hook, is a weighted latch, H, which when at rest closes the opening $o$ of the hook. The weighted end of said latch projects into a notch in the top of the base portion of said hook, thus enabling the weighted end to be made sufficiently heavy to insure the closing of the latch. By passing a checkrein under the horn $l$ of the hook and forward against the point $k$ of the latch and into the said opening $o$, the latch will be turned into the position shown in dotted lines in Fig. 2; but as soon as the checkrein has passed the said point $k$ the latch will return to the position shown in full lines in said figure, and effectually close the opening and prevent the checkrein escaping therefrom until released.

In adapting the hook C to the ordinary saddle-tree now in use I provide it with a shank having formed on it a screw to receive a nut to confine it to the tree in the usual manner, as shown in Fig. 4.

Having described my invention, what I claim is as follows, viz:

1. The harness-saddle tree provided with the abutment $e$, and having the hole or opening $a$, and the notch $b$ and rabbets $f\,f$, as shown, in combination with the saddle F, having the hole $g$ and notch $h$, corresponding in shape to the hole $a$ and notch $b$ in the abutment, and the checkrein-hook C, having pivoted to it the weighted latch H, and provided with the projections $c$ and $d$, to enter the said holes and notches and be secured to the tree by the screw D, all substantially as described and represented.

2. The harness-saddle tree provided with the projection or abutment $e$, the opening $a$, notch $b$, and rabbets $f\,f$, and having arranged therein a hole screw-threaded and parallel, or practically so, to the top of the abutment to receive the screw D, all as shown, and substantially as described.

In testimony whereof I affix my signature in the presence of two witnesses.

WILLARD S. EVERETT.

Witnesses:
HENRY S. BUNTON,
SUSAN A. DUTTON.